United States Patent [19]

Bannon et al.

[11] Patent Number: 4,530,848

[45] Date of Patent: Jul. 23, 1985

[54] METHOD FOR PRODUCING A NON-SEGREGATING INSTANT STUFFING MIX AND PRODUCT THEREOF

[75] Inventors: Glen M. Bannon, Dover; Darlene A. Hardie-Muncy, Bear; Ronald P. Wauters, Dover, all of Del.

[73] Assignee: General Foods Corporation, White Plains, N.Y.

[21] Appl. No.: 517,864

[22] Filed: Jul. 27, 1983

[51] Int. Cl.³ .............................................. A21D 13/00
[52] U.S. Cl. ................................... 426/293; 426/302; 426/392; 426/555
[58] Field of Search ............... 426/302, 555, 128, 293, 426/392

[56] References Cited

U.S. PATENT DOCUMENTS

| 3,870,803 | 3/1975 | Siems et al. | 426/555 |
| 3,870,806 | 3/1975 | Capossela et al. | 426/555 |
| 4,068,009 | 1/1978 | Rispoli et al. | 426/291 |

*Primary Examiner*—Raymond Jones
*Assistant Examiner*—Elizabeth A. King
*Attorney, Agent, or Firm*—Thomas R. Savoie; Sam D. Walker; Daniel J. Donovan

[57] ABSTRACT

An instant stuffing mix is prepared by coating oil onto the surface of specifically-sized bread crumbs and then distributing a powdered seasoning blend over the oil-coated crumbs so as to uniformly aggregate the powder with the crumbs. Properly-sized freeze dried vegetable pieces and, if desired, dried vegetable flakes, are then added. The resulting product can be prepared into a stuffing by the consumer in a single hydration step, and any desired serving size can be easily and uniformly prepared from a bulk-packaged product.

3 Claims, No Drawings

METHOD FOR PRODUCING A NON-SEGREGATING INSTANT STUFFING MIX AND PRODUCT THEREOF

TECHNICAL FIELD

This invention relates to a new and improved process for the aggregation of moisture sensitive materials in the production of an instant stuffing mix. More particularly, this invention relates to a means for combining bread crumbs, whose structure is moisture sensitive and collapses upon exposure to the moisture levels used in traditional agglomeration methods, with powdered materials and other particulate matter in order to produce a uniform, non-segregating stuffing mix.

Food processors desire to package their food products in a manner compatable with the broadest range of consumer needs. Consumers require the freedom to choose their own serving size. Consequently, foodstuffs are packaged to optimize the consumer's choice of serving sizes from the package whenever practicable. However, free-flowing mixtures having particles of different size and density segregate after packaging, thereby restricting the feasible serving sizes to one: the entire package. Generally, the art has corrected this problem by agglomerating the segregating mixture to produce a non-segregating mixture.

BACKGROUND ART

In the past, foods have been agglomerated by a variety of methods, including: steaming and contacting the moistened food particles; moistening and pressing the food particles together, U.S. Pat. No. 518,891 issued to Manwaring; and blending a solid food or foods with an aqueous or an aqueous miscible fluid, U.S. Pat. No. 3,100,909 issued to Schapiro. However, the structure of some foodstuffs, e.g. bread crumbs, collapses at intermediate and high mositures when agitated, thus precluding the use of agglomeration methods wherein the foodstuff is moistened to these levels. Consequently, Hege, U.S. Pat. No. 3,987,138, developed a low moisture method of agglomeration. Hege teaches the use of a small amount of water dispersed in a large volume of a nonmiscible, inert, liquid carrier to lightly moisten the food. However, this procedure may leave an unacceptable residue of the nonmiscible, inert, liquid carrier in the food.

Von Kamienski et al., U.S. Pat. No. 4,328,253, teaches a process for preparing deep-frozen foods with free apportionability wherein a dry mix containing flavorings, spices and a swelling substance is combined with partially fat-coated, frozen vegetables in a manner whereby the swelling substance (e.g. gelatin) binds the available free water and causes the dry mix to adhere to the frozen vegetables. U.S. Pat. No. 4,260,637 to Rispoli et al. sets forth a process for applying seasonings and an adhesive to the surface of bread crumbs with the aid of an edible oil.

DISCLOSURE OF THE INVENTION

This invention involves a process for aggregating diverse materials, especially food materials and is most useful for aggregating diverse food materials wherein one of the materials possesses a structure which is likely to collapse when exposed to moderate or high moisture and agitated, such as occurs in most prior art agglomeration processes. Leavened, baked and dried farinaceous materials, such as bread crumbs and croutons, are suitable for use in this invention.

This invention is preferably employed for the production of a non-segregating, free-flowing and dehydrated instant stuffing mix which can be quickly prepared by the consumer in a one-step process. This invention will be further described in terms of manufacture of such a stuffing mix which includes bread crumbs, dry spices and/or flavorings and dried vegetables. However, the invention is broadly applicable for the aggregation of composite foodstuffs containing a porous, moisture-sensitive component in order to produce a non-segregating product. This invention is particularly suited for situations where the moisture level of the ingredients to be aggregated as well as the moisture level of the finished product must be maintained at a low level in order to insure storage stability.

A preferred embodiment of the present invention is a method for preparing an instant stuffing mix which comprises spraying vegetable oil onto an agitated bed of diced and dried (typically less than 8% moisture by weight) bread crumbs and thereafter combining a dry (typically less than 6% moisture by weight), preblended seasoning mix with the oil coated bread crumbs in a manner which uniformly distributes the seasoning mix over the surface of the crumbs and which does not promote attrition or breakage of the crumbs. Dried (typically less than 10% moisture by weight), quick-rehydrating vegetable pieces such as freeze dried celery are then combined with the seasoning-crumb aggregates in a manner which avoids excessive breakage of either the vegetable pieces or the crumbs. The dried vegetable pieces are sized comparable to the seasoning-crumb aggregates so that segregation of these two components in the package is minimized. Dried parsley flakes (typically less than 10% moisture by weight) are also combined with the aggregate-vegetable piece mixture, preferably as the final step prior to packaging.

In the preparation of an instant, free-flowing bread stuffing mix it is critical that breakage or attrition of the bread crumbs is avoided. Broken bread crumbs could result in particle segregation in the packaged product creating an undesirable layer of fine particles. Attrition of the bread crumbs results in fine particles which, if not removed and disposed of, interfere with consumer measurement and preparation of the product.

BEST MODE FOR CARRYING OUT INVENTION

Dried and diced bread crumbs, such as the high density bread crumbs described in U.S. Pat. No. 4,207,346 to Wauters et al. were prepared and a particle fraction wherein all of the crumbs passed through a No. 2.5 Tyler mesh screen (screen openings of 8 mm) and were retained on a No. 14 U.S. Standard Sieve (screen openings of 1.41 mm) was separated. Preferably at least 50% by weight of these crumbs will be retained on No. 5 U.S.S. Sieve. This separated crumb fraction was then spread onto a vibrating conveyor belt. A partially hydrogenated vegetable oil was sprayed onto the vibrating bed of bread crumbs at a level of from 5 to 10% by weight of the crumbs. Typically, the oil will be sprayed through a plurality of spray nozzles so that an essentially uniform oil coating is produced on all of the bread crumbs.

A seasoning blend containing ground or powdered materials such as salt, pepper, sugar, onion powder, monosodium glutamate, natural spices and natural and artificial flavors are then allowed to fall onto the vibrating bed of oil-coated crumbs in a manner that will effect uniform distribution of the seasoning blend onto the oil-coated crumb surfaces. The seasoning blend will typically be dispersed by a single feeder which distributes the blend across the entire width of a longitudinally-moving, agitated bed of oil-coated crumbs. In this manner, the particles which constitute the seasoning blend adhere to each and every surface of the oil-coated crumbs. The amount of seasoning blend which is utilized may vary over wide ranges, but will typically be between 5% and 20% by weight of the bread crumbs (uncoated). A preferred means for distributing the seasoning blend onto the oil-coated crumbs would be a positive distributed feeder having a width equal to that of the crumb bed. Such a feeder could be equipped with a rotary gate valve, star wheel or oscillating conveyor arm mechanism which can be operated over a range of distribution rates to correspond to flow of the crumbs beneath the feeder.

The oil-coated crumbs and seasoning blend aggregate is conveyed past a second distribution station where pieces of dried, rapidly-rehydratable vegetable are combined with the aggregate. The vegetable pieces will preferably have a particle size and density comparable to that of the bread crumbs. Suitable cutting and sizing techniques will be employed so that essentially all of the vegetable pieces have a maximum dimension of between 1.5 and 8 mm and preferably between 3 and 7 mm. In this manner the vegetable pieces and bread crumbs will be less likely to segregate either during handling, packaging or distribution of the packaged product. The vegetable pieces will typically be added at a level from 1% to 5% by weight of the bread crumbs. Diced and dried celery, carrots, onions and the like may be included in the stuffing product as desired.

As the stuffing product of this invention is designed for one-step preparation by the consumer (i.e., composite product to be hydrated in single step), the dried vegetable must hydrate at essentially the same rate as the oil-coated crumb/seasoning blend aggregate. As will be appreciated by those skilled in the art, both the oil coating and the adhered seasoning blend will tend to retard hydration of the bread crumbs; however, it will still be necessary to employ dried vegetable pieces which rehydrate faster than conventional air dried vegetables. Freeze dried vegetables and/or puffed dried vegetables will be suitable for use in this invention.

The rapidly-rehydratable vegetable pieces may be combined with the seasoned-crumb aggregate in a variety of manners so long as care is taken to minimize fracture or attrition of either the bread crumbs or the dried vegetables. According to a preferred embodiment of this invention, the bed of seasoned crumbs is moved on a vibratory conveyor beneath a vegetable distributor. The dried vegetable pieces may be dispersed by means of one or more vibrating distributor pans.

Dry vegetable flakes, such as parsley flakes, may be added to the stuffing product for their normal taste and appearance characteristics. These dried flakes which typically will be added at a level of less than about 2% by weight of the bread component, preferably from 0.3% to 1.5% by weight of the crumbs, are preferably incorporated into the stuffing product after addition of the dried vegetable pieces. As the dried vegetable flakes are especially prone to breakage, the amount of handling to which the flakes are subjected should be minimized. Desirably, these flakes are the last ingredient to be incorporated into the product. Vibrating distributor pans are useful for dispensing the flakes onto a moving and agitated bed of stuffing mix.

The vibratory conveyor mechanism which may be used to move the bread crumbs through the product formulation cycle preferably consists of a plurality of separate conveyor belts. Desirable, separate belts are used for each of the oil-coating, seasoning blend addition and vegetable particle and/or flake addition steps. In this manner, any dispensed oil and/or seasoning blend which is not coated or agglomerated onto the bread crumb surface and is deposited onto the conveyor will not be conveyed to downstream operations. Another method for carrying out the invention utilizes a rotary coating reel for the coating of oil and/or seasoning onto the bread crumbs. Vegetable pieces and flakes may also be added in the coating reel or on an adjacent conveyor belt.

EXAMPLE 1

Diced and dried bread crumbs were screened to obtain a size fraction wherein all crumbs passed through a #2.5 Tyler screen, with 80% by weight of the crumbs being retained on a #5 U.S.S. screen and 18% by weight being retained on a #14 U.S.S. screen. A bed of these crumbs was gently agitated and sprayed with a hydrogenated vegetable oil in order to provide a uniform oil coating at a level of about 7% by weight of the crumbs. The oil-coated crumbs were then combined with a seasoning blend at a level of about 10% by weight of the uncoated crumbs by distributing the seasoning blend over the gently agitated bed of oil-coated crumbs. The particles of seasoning blend adhered firmly to the oil-coated crumbs. Approximately 1.25% of freeze dried celery pieces and 0.6% of parsley flakes were then combined with the crumb/seasoning aggregate. The celery pieces were freeze dried particles having a size of approximately 3×6 mm.

The above prepared mixture was packaged as a free-flowing, non-segregating, instant stuffing product. This product can be prepared into a uniform fluffy stuffing by removing desired amounts of the dry product from the package and stirring with a fork into a boiling water-butter solution (about 1 part butter and 8.4 parts water) at a ratio of approximately 1:2.6, until the stuffing mix is fully hydrated.

EXAMPLE 2

Diced and dried bread crumbs were screened as in Example 1. A stream of these crumbs was fed into a rotary coating reel lined with longitudinal flights and rotating at 8 RPM. Seasoning blend at 10% of the bread crumb weight was also fed into the reel. Hydrogenated vegetable oil was sprayed onto the tumbling crumbs and spice at a level of about 7% of the crumb weight. Approximately 1.25% of freeze dried celery pieces and 0.6% of parsley flakes were fed into the tumbling mixture. The finished product, with spice firmly adhered to crumbs was packaged and prepared as described in Example 1.

Having thus described the invention, what is claimed is:

1. A process for making a non-segregating, free-flowing, instant stuffing mix comprising:
   (a) obtaining a particle fraction of diced and dried bread crumbs wherein essentially all of the particles pass through a No. 2.5 Tyler screen and are retained on a No. 14 U.S. Standard Sieve and wherein at least 50% by weight of the particles are retained on a No. 5 U.S. Standard Sieve;
(b) uniformly spraying a hydrogenated vegetable oil onto the surface of the bread crumbs at a level of from 5% to 10% by weight of the crumbs;
(c) gently agitating the oil-coated bread crumbs and depositing a powdered seasoning blend onto the agitated crumbs in a manner which uniformly aggregates the powder onto the crumb surfaces at a level of from 5% to 20% by weight of the uncoated crumbs;
(d) admixing particles of rapidly-rehydratable, freeze-dried or puff-dried vegetables with the bread crumb-seasoning blend aggregates, the vegetable particles having a maximum dimension of from 1.5 to 8 mm.; thereafter,
(e) adding dried parsley flakes to the admixture of step (d) at a level of from 0.3% to 1.5% by weight of the uncoated crumbs; and then,
(f) packaging the admixture of step (e).

2. The process of claim 1 wherein the vegetable particles include particles of freeze dried celery.

3. A dry stuffing mix produced in accordance with the process of claim 2.

* * * * *